United States Patent

[11] 3,540,772

[72] Inventor Raywood C. Weiler
17586 Vine St., Fontana, California 92335
[21] Appl. No. 842,604
[22] Filed July 17, 1969
[45] Patented Nov. 17, 1970

[54] CAMPER TIE DOWN
4 Claims, 9 Drawing Figs.
[52] U.S. Cl. .................................................... 296/23,
296/35, 248/361
[51] Int. Cl. ..................................................... B60p 3/32
[50] Field of Search........................................ 296/35.1,
23MC; 224/42.45, 29; 214/515; 248/361;
24/73GS, 263.3; 280/179

[56] References Cited
UNITED STATES PATENTS
2,050,981 8/1936 Cohen.......................... 224/42.31UX
3,489,454 1/1970 Manteufel..................... 296/35.1X Primary Examiner—Gerald M. Forlenza
Assistant Examiner—John Mannix
Attorney—Dana E. Keech ABSTRACT: A tie down device for campers in which the panel attachment member for the camper is anchored to the top side and inner angle lip of the truck bed by means of a lip clamp adjustably secured to an inner depending extension of the attachment member. The inner extension may have an adjustable clamping connection with the truck body. The adjustable lip clamp may or may not be associated with a truck bed fixture hole plug.

Patented Nov. 17, 1970 3,540,772

INVENTOR
RAYWOOD C. WEILER
By
Attorney

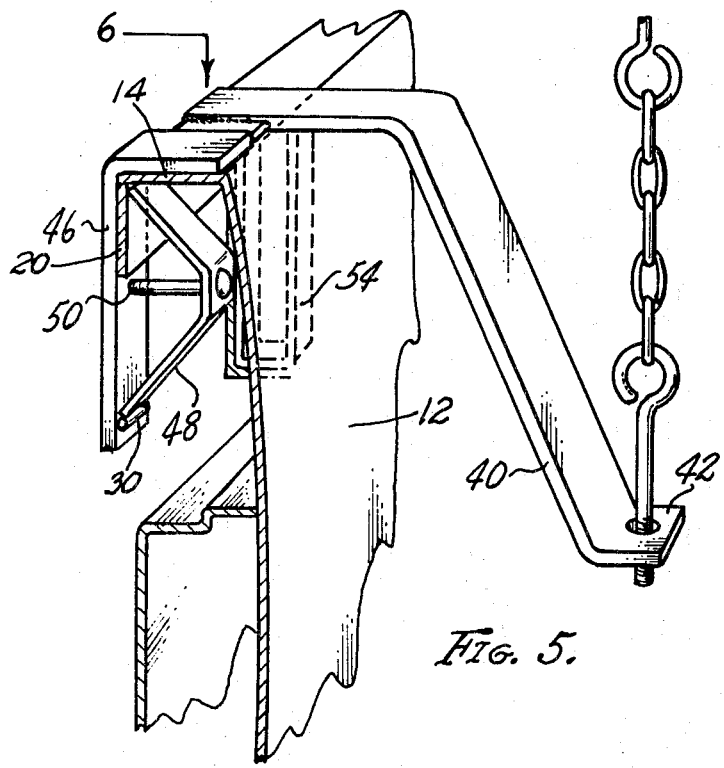
Fig. 5.
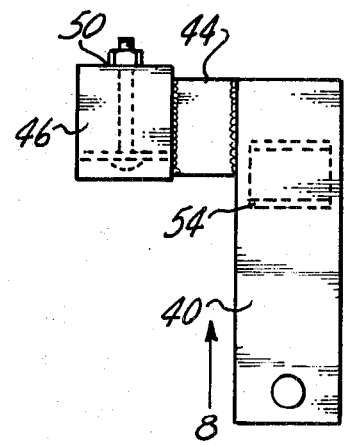
Fig. 6.
Fig. 7.
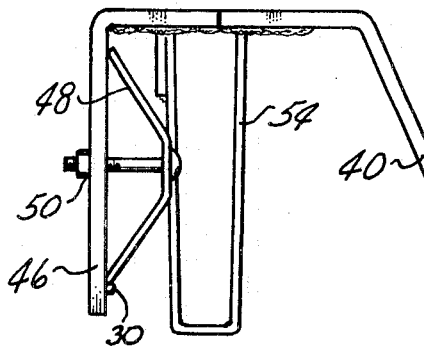
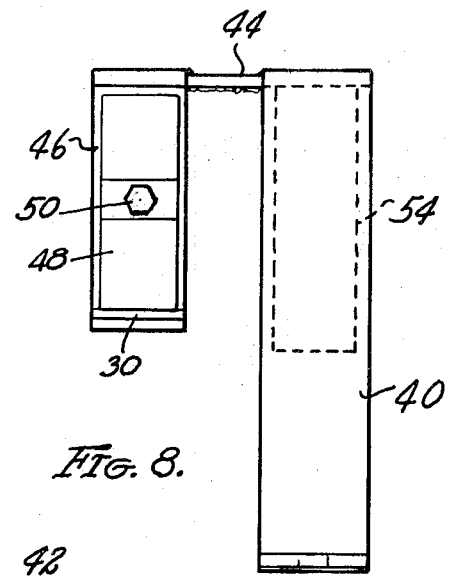
Fig. 8.
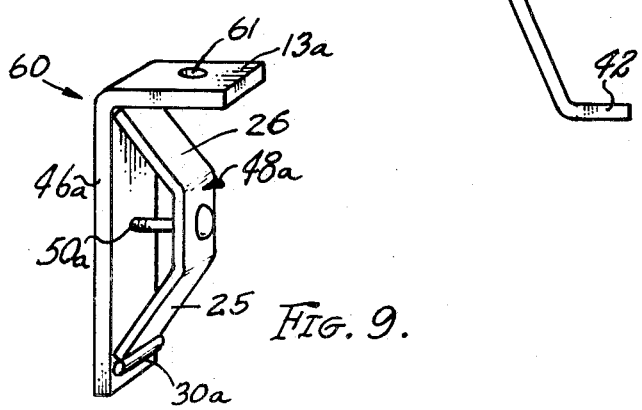
Fig. 9.
INVENTOR
RAYWOOD C. WEILER
BY
Attorney

3,540,772

CAMPER TIE DOWN

SUMMARY OF THE INVENTION

One of the objects of the invention is to provide a quick detachable camper tie down that is clamped to the truck bed inner angle lip and requires no additional bolts or other connecting means.

Another object of the invention is in the provision of a camper tie down device complete in itself and requiring no additional attaching means, for quick attachment to or release from the truck body.

Still another object of the invention lies in the releaseable means for clamping the device to the inner angle lip of the truck body.

Yet another object of the invention is in the provision of adjustable means that insures easy and quick installation on most pickup truck bodies.

There are a number of camper tie down devices on the market and the present applicant has devised several that make it relatively easy for the owner or user of a camper to secure it quickly and firmly to the truck body. It is particularly desired that the device be made for quick use and adaptability to various makes of truck bodies without extra bolts, connections and drilling other body defacement.

The fundamental theory of the present invention is to provide a powerfully secured, quickly attachable and detachable angled anchor member overhanging and having releaseable clamping connection with the truck body top side and inner angle lip. No additional connecting means is necessary. Certain modifications may be used to strengthen the bracket if desired.

These and other objects and advantages of the present invention will become apparent to those skilled in the art upon consideration of the following detailed description of the preferred embodiment thereof, reference be made to the accompanying drawings, herewith wherein:

BRIEF DESCRIPTION OF THE DRAWINGS

FIG. 5 is a perspective view of a modified form of the device mounted on a truck body.

FIG. 6 is a view of the bracket taken in the direction of arrow 6 in FIG. 5.

FIG. 7 is a side elevational view of the modified tie down bracket.

FIG. 8 is a view taken in the direction of arrow 8 in FIG. 7.

FIG. 9 is a perspective view of another modified form of the invention.

DESCRIPTION OF THE PREFERRED EMBODIMENT

Figure 1:
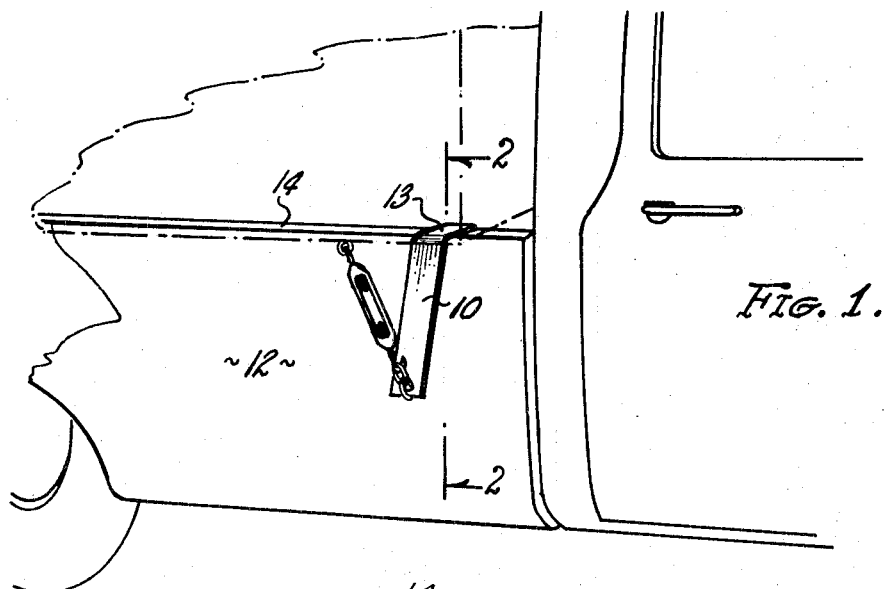
FIG. 1 is a perspective view of a preferred form of the tie down bracket in position of use.
Figure 2:
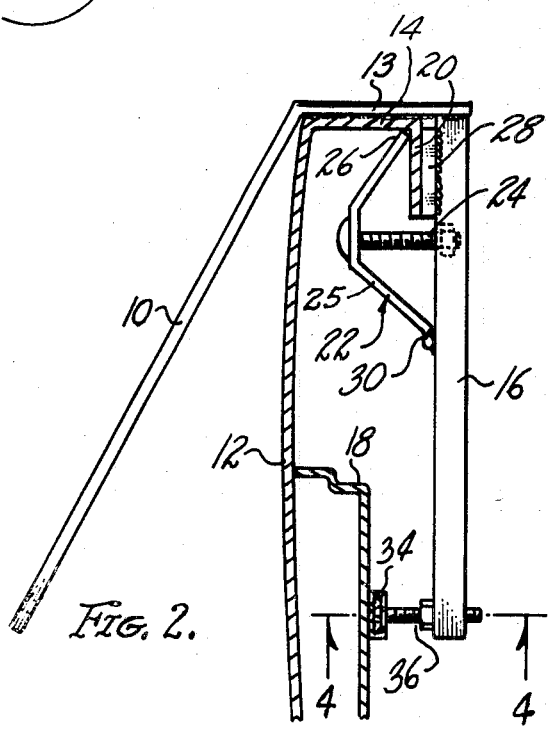
FIG. 2 is an enlarged sectional view taken on the line 2–2 of FIG. 1.
Figure 3:
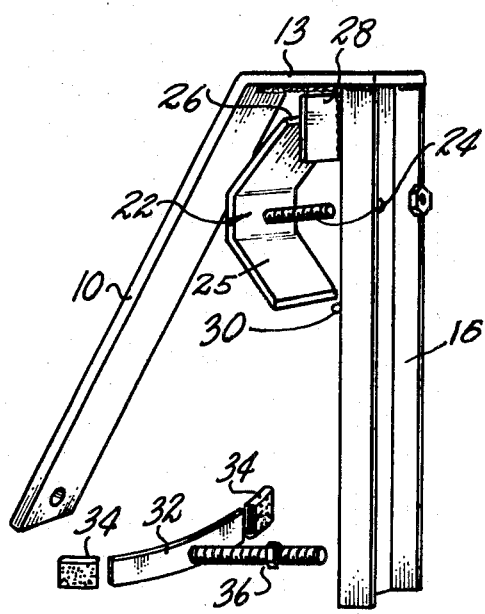
FIG. 3 is an exploded perspective view of the device of FIGS. 1 and 2.
Figure 4:
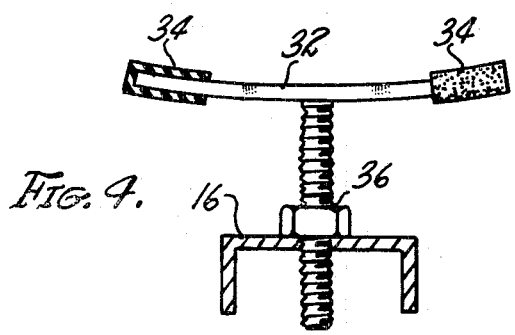
FIG. 4 is an enlarged sectional view taken on the line 4–4 of FIG. 2.

The drawings disclose a preferred embodiment of the invention in FIGS. 1 through 4 and two modified forms in FIGS. 5 through 9. The basic theory of attachment to the truck bed inner angle lip is found in all forms of the invention disclosed.

In FIGS. 1 through 4, an outwardly projecting arm 10, providing a camper holding element, extends away from the conventional side panel 12 of the truck bed or body. The arm 10 has a flat intermediate portion or member 13 that lies on top wall 14 of the panel 12. An integral or welded extension 16 of the member 13 depends downwardly a considerable distance within the truck body and adjacent to the inner side or a conventional projection 18 of the panel 12. The extension 16 may be a channel iron. The standard pickup side panel top wall 14 has an inner angle lip 20. A spreadable clamp 22 formed of flexible sheet metal is adjustably secured by a bolt 24 to the extension 16. This clamp includes angled wings 25 and 26. The upper wing 26 of the clamp 22 engages the inside of the right angle formed between the panel lip 20 and panel top wall 14. A laterally projecting element 28 is welded to the upper inner side of the extension 16. The purpose of this extended clamping area is to increase the tie down bracket securement. The lower wing 25 of the clamping bracket 22 contacts a bead 30 welded on the inner side of the extension 16 to complete the clamping action.

It is intended that the tie down bracket be further and adjustably secured so that the anchor arm can be lined up with the connection on the camper body. This is accomplished by means of a wide stabilizing bar 32 having rubber covered end areas 34 to prevent truck body defacement. The bar 32 is releaseably and adjustably secured to the lower end of the extension 16 by the threaded bolt and nut connection 36.

The operation of the bracket described is believed apparent and its attachability and detachability easily and quickly accomplished. No additional attaching means are necessary. The device is clamped to the panel top wall 14 and inner angle lip 20 and the lower adjustment is made to suit the condition.

The modified tie down device of FIGS. 5 through 8 differs in certain parts but not sufficiently to redescribe the entire mechanism. Fundamentally, the device is basically the same with some exceptions and additions. The arm 40 may or may not have an outturned apertured connecting lip 42. The arm 40 overlies the top wall 14 of the body panel 12 but is attached by a lateral web 44 to a spaced downwardly and inwardly projecting short extension 46 like earlier described element 16. A similar flared clamping bracket 48 releaseably and adjustably secured at 50 to the extension 46 is clamped to the inner angle lip 20 and to the beaded extension 46 as previously described. A plug 54 welded to the under side of the arm 40 engages the conventional socket in the pickup side panel 12 and thus further prevents lateral bracket movement. The modified device lacks the additional adjustable connection of the preferred embodiment but it adds the socket plug 54.

A simplified version 60 of the camper tie down of the invention is shown in FIG. 9 as comprising members 46a and 13a which correspond to members 16 and 13 respectively of the preferred embodiment. Members 46a and 13a likewise form a right angle which fits the angle formed by panel top 14 and inside lip 20. A two pronged clamp 48a is secured to member 46a by a bolt 50a and bears against a bead 30a to lock the tie down 60 to the panel 12.

Member 13a has an aperture 61 through which a bolt (not shown) may be extended for securing the camper to the tie down 60 and thus to the panel 12 with which the tie down 60 is united by the clamp 48a.

I claim:

1. A camper tie down device adapted for releaseable attachment to a pickup body side panel having a top wall with a down bent inner lip forming an angle with said top wall, said device comprising:

a horizontal member adapted to be panel-top-wall-supported;

an inner downward extension of said member forming an angle therewith;

clamp means adjustably connected to said inner downward extension and adapted to pressurally expand in a plane dividing the inner angle between said top wall and its inner lip and thus firmly secure the tie down device to said panel; and means on said device suitable for connecting the same to a camper.

2. A device as set forth in claim 1 in which the inner extension has an adjustable stabilizing contacting surface engaging the inner truck body side portion.

3. A device as set forth in claim 1 in which a laterally extended pressure member is secured to the upper inner side of the inner extension and engageable with the inner angle lip when clamped thereto.

4. A device as set forth in claim 1 wherein said clamp means comprises:

a flexible sheet metal member having spreadable upper and lower angled wings joined centrally;

bead means formed on the inner surface of said downward extension, said bead means being engaged by the lower of said wings;

bolt means contractively connecting said member, at the juncture of said wings, to said downward extension; and said upper wing terminating close within and intersecting the angle between said horizontal member and said downward extension thereof.